United States Patent [19]

Irish et al.

[11] Patent Number: 4,721,448
[45] Date of Patent: Jan. 26, 1988

[54] PELLETIZER WITH MOISTURE CONTROL SYSTEM

[75] Inventors: Mark R. Irish, Westminster; Marlin B. Hull, Lakewood, both of Colo.

[73] Assignee: Adolph Coors Company, Golden, Colo.

[21] Appl. No.: 811,006

[22] Filed: Dec. 19, 1985

[51] Int. Cl.$^4$ .................. A23N 17/00; B01F 15/04
[52] U.S. Cl. ........................ 425/144; 99/487; 99/517; 264/40.2; 264/40.6; 364/469; 364/476; 364/502; 366/152; 366/158; 425/173; 425/174.4; 425/209; 425/404; 425/DIG. 230
[58] Field of Search ..... 425/143, 144, 135, DIG. 230, 425/173, 174.4, 209, 404; 364/183, 468, 469, 471, 476, 502; 99/487, 493, 517; 366/152, 158, 168; 264/40.1, 40.2, 40.6, 22, 142

[56] References Cited

U.S. PATENT DOCUMENTS

| | | |
|---|---|---|
| 3,148,971 | 9/1964 | MacDonald et al. ............... 364/477 |
| 3,573,924 | 4/1971 | Zarow ................................ 426/630 |
| 3,932,736 | 1/1976 | Zarow et al. ....................... 364/468 |
| 4,091,060 | 5/1978 | Carter et al. ....................... 364/502 |
| 4,183,675 | 1/1980 | Zarow ................................ 366/144 |
| 4,340,937 | 7/1982 | Volk, Jr. ............................. 364/468 |
| 4,342,361 | 8/1982 | Volk, Jr. ............................. 165/113 |
| 4,463,430 | 7/1984 | Volk, Jr. et al. .................... 364/469 |

Primary Examiner—Jay H. Woo
Assistant Examiner—James C. Housel
Attorney, Agent, or Firm—Klaas & Law

[57] ABSTRACT

A moisture control system is provided for a pelletizing process wherein the moisture content of the pellets leaving the pelletizing process is constantly monitored and differences between the measured moisture content of the pellets and a set point indicating the desired moisture content of the pellets are used to regulate variable process controls in the pelletizing process so that the pellets leaving the pelletizing process will have the proper moisture content. Also, a system for protecting a viewing window of an instrument from contaminants is provided.

5 Claims, 6 Drawing Figures

MC—MOISTURE CONTROLLER
FC—FLOW CONTROLLER
TC—TEMPERATURE CONTROLLER
SC—SPEED CONTROLLER
SP—SET POINT
PV—PROCESS VARIABLE
CV—CONTROL VARIABLE
FT—FLOW TRANSMITTER
TT—TEMPERATURE TRANSMITTER
MT—MOISTURE TRANSMITTER

MC—MOISTURE CONTROLLER
FC—FLOW CONTROLLER
TC—TEMPERATURE CONTROLLER
SC—SPEED CONTROLLER
SP—SET POINT
PV—PROCESS VARIABLE
CV—CONTROL VARIABLE
FT—FLOW TRANSMITTER
TT—TEMPERATURE TRANSMITTER
MT—MOISTURE TRANSMITTER

PV = PROCESS VARIABLE
SP = SET POINT

V = CONTROLLED VARIABLE
$V_P$ = PROPORTIONAL TERM $[K_P(E)]$
$V_I$ = INTEGRAL TERM $[K_I \int (E)dt]$
$V_D$ = DERIVATIVE TERM $[K_D \frac{d(E)}{dt}]$

PELLETIZER WITH MOISTURE CONTROL SYSTEM

FIELD OF THE INVENTION

This invention relates generally to a pelletizing process used to process ingredients into pellets suitable for cattle feed and more particularly to a system for moisture control in such a pelletizing process to ensure that the pellets leaving the process have the proper amount of moisture therein.

BACKGROUND OF THE INVENTION

In the manufacture of beverages, such as beer, it is most desirable to use the by-products remaining after the beverage has been made in some commercial process. In the beer industry, a commercial process has developed in the pelletizing of the spent grain, screenings, sprouts, diatomaceous earth and syrup into pellets for cattle feed. In a conventional pelletizing system, the dry products are combined with the syrup and heated by steam in a mixer-conditioner into a granular product. This granular product is then fed into a mill which converts the granular product into pellets. After the pellets have been formed, they are deposited into a shaker-cooler in which a level of formed pellets is maintained. Cool air is drawn through the formed pellets in the shaker-cooler so that the formed pellets leave the shaker-cooler at the desired temperature. In one commercial operation, the pellets leaving the shaker-cooler are periodically sampled for moisture content and when necessary, the operator makes adjustments to the syrup feed or steam feed or both. A problem associated with this system of moisture control is the time lapse from the mixer-conditioner to the exit of the shaker-cooler. Therefore, there is no assurance that the existing conditions in the mixer-conditioner have remained the same when the adjustments are being made.

SUMMARY OF THE INVENTION

This invention provides a system that constantly monitors moisture content of the pellets leaving a shaker-cooler and transmits a signal to adjust the controls of fluid feed systems and to adjust the set point of other moisture content monitoring systems. The moisture control system of this invention ensures that the pellets leave the shaker-cooler with the proper amount of moisture therein.

In a preferred embodiment of the invention, an infrared moisture analyzer is located so as to measure the moisture content of the pellets leaving the shaker-cooler and generates a signal indicative of such moisture content which signal is fed to a pellet moisture controller. The signal from the infrared analyzer is compared by a pellet moisture controller with a set point corresponding to the desired moisture content for the pellets leaving the shaker-cooler. If the compared measured moisture content is not correct, the pellet moisture controller performs a calculation which results as a calculated set point signal which is fed to a granular moisture controller. Another infrared moisture analyzer is located so as to measure the moisture content of the granular material leaving the mixer-conditioner and generates a signal indicative of such moisture content and which signal is fed to a granular moisture controller. The calculated set point signal from the pellet moisture controller is fed into the granular moisture controller, is compared with the measured granular moisture content and the granular moisture controller performs a calculation which results in a calculated set point signal which is fed to a flow controller. The flow controller responds to the calculated set point signal received from the granular moisture controller and adjusts the amount of syrup being fed into the mixer-conditioner. Also provided in the system are means to sense the temperature of the granular material leaving the mixer-conditioner so as to control the amount of steam being introduced into the pelletizing process. Means are also provided to respond to a change in the amount of steam condensate (moisture) being introduced into the pelletizing process so as to adjust the amount of syrup being introduced into the pelletizing process.

It is an object of this invention to constantly monitor the moisture content of pellets leaving a shaker-cooler in a pelletizing process and to make adjustments in the pelletizing process to ensure that the pellets leaving the shaker-cooler have the proper moisture content.

Additional objects, advantages and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

DETAILED DESCRIPTION OF THE INVENTION

Figure 1:
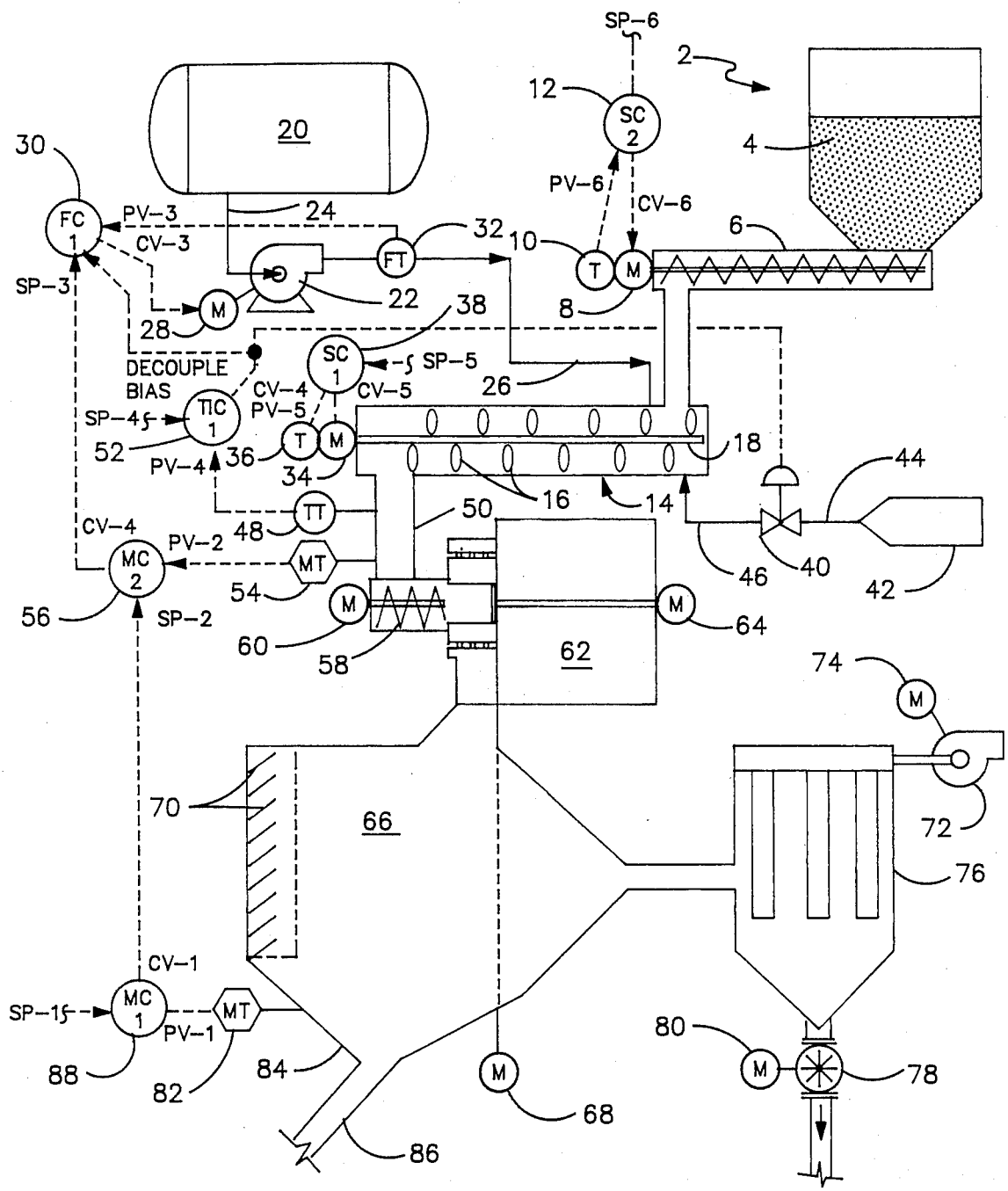
FIG. 1 is a process and instrumentation diagram for a pelletizing process using a moisture control system of this invention.

The pelletizing process illustrated in FIG. 1 comprises a bin 2 which receives a mixture of ingredients 4 from a dry ingredient mixing apparatus (not shown). The ingredients include spent grain, screenings, sprouts, diatomaceous earth and dust, all of which are by-products from the manufacture of beer. The ingredients 4 are removed from the bin 2 by a variable speed screw conveyor 6 which is driven by a motor 8 and is provided with a tachometer 10. A variable speed controller 12 governs the rate of speed of the screw conveyor 6 and may be set at the desired tonnage per hour.

The screw conveyor 6 feeds the ingredients 4 into a mixer-conditioner 14 having suitable variable pitch mixing blades 16 which are mounted on a rotatable shaft 18 for rotation therewith. A tank 20 is mounted in a fixed location and has a continuous supply of syrup. A pump 22 receives syrup from the tank 20 through pipeline 24 and pumps the syrup through pipeline 26 into the mixer conditioner 14. The pump 22 is driven by a variable speed motor 28. A controller 30 is provided with a set point for governing the speed of the motor 28 for controlling the amount of syrup being fed into the mixer-conditioner 14. A flow sensor 32 senses the flow of the syrup through the pipeline 26, usually in gallons per minute, and sends a signal to the controller 30 which compares it to the set points and makes any necessary changes in the speed of the motor 28.

The shaft 18 is rotated by the motor 3 which is provided with a tachometer and is controlled by a variable speed controller 38. The retention time of the granulated product in the mixer-conditioner is usually about two minutes. The shaft 18 is rotated at a rate between about 20 and 125 revolutions per minute.

A variable valve 40 is mounted in a fixed location and is connected to a source of steam 42 at 50 psig by a pipeline 44. The variable valve 40 is operated to send the proper amount of steam (pounds per hour) through the pipeline 46 into the mixer conditioner 14. A temperature probe 48 senses the temperature of the granular material leaving the mixer-conditioner 14 in the duct 50 and transmits a signal to a controller 52. The controller 52 has a set point of the desired temperature of the granular material leaving the mixer-conditioner 14 and compares the received temperature signal with the set point and makes any necessary adjustments in the variable valve 40. Since the directly injected steam also provides moisture in the pelletizing process, the controller 52 also sends a decouple bias signal to the controller 30 so that any necessary adjustments can be made in the amount of syrup being fed into the pelletizing process.

An infrared moisture analyzer 54 is located so as to measure the moisture content of the granular material leaving the mixer-conditioner 14 in the duct 50. The infrared moisture analyzer 54 transmits a signal to the controller 56 which has a set point of the desired moisture content of the granular material leaving the mixer-conditioner in the duct 50. The controller 56 compares the moisture content signal with the set point, performs a calculation to produce a calculated set point signal and transmits the calculated set point signal to the controller 30 so as to adjust the amount of syrup being fed into the pelletizing process.

The granular material exits from the duct 50 into a screw type force feeder 58 driven by a fixed speed motor 60. The feeder 58 is connected with a mill 62 driven by a fixed speed motor 64. The mill 62 receives the granular material from the feeder 58 and agglomerates the granular material to form generally cylindrical shaped pellets having variable lengths of between about 0.50 and 1.50 inches and a diameter of about 0.25 inch.

The pellets from the mill 62 are fed into a shaker-cooler 66 which is driven by a fixed speed motor 68. Conventional means (not shown) are used to keep a substantially constant level of pellets in the shaker-cooler 66. Air from suitable sources is pulled into the shaker-cooler 66 through the vanes 70 by a blower 72 driven by a fixed speed motor 74. The air passes through the pellets in the shaker-cooler 66 and withdraws heat, moisture and some dust from the pellets and then passes into the bag house 76 which is provided with a conventional air lock 78 driven by a fixed speed motor 80.

An infrared moisture analyzer 82 is located in a fixed position so as to measure the moisture content of the pellets in the hopper 84 of the shaker-cooler 66 before the pellets enter the transfer conveyor 86. The infrared moisture analyzer 82 transmits a signal to a controller 88 which has set point relating to the desired moisture content of the pellets in the hopper 84. The controller 88 compares the moisture content signal received from the infrared moisture analyzer 82 with the set point, performs a calculation to produce a calculated set point signal and sends the calculated set point signal to the controller 56. The controller 56 compares the calculated set point signal received from the controller 88 with the measured moisture content of the granular material in the duct 50, performs a calculation to produce a calculated set point signal and sends such calculated set point signal to the controller 30 so as to adjust the amount of syrup being fed into the pelletizing process.

In operation of the moisture control system, the infrared moisture analyzer 82 measures the moisture content of the pellets in the hopper 84 thereof and transmits a signal indicating such moisture content to the controller 88. The controller 88 compares the signal from the infrared moisture analyzer 82 with a set point in the controller 88 for the desired moisture content of the pellet in the hopper 84. If the moisture content of the pellet is too high, the controller lowers the calculated set point signal being sent to the controller 56. The controller 56 responds to the calculated set point signal received from the controller 88 and decreases the calculated set point signal being sent to the controller 30. The controller 30 responds to the calculated set point signal received from the controller 56 and transmits a signal to the variable speed motor to reduce the amount of syrup being supplied to the pelletizing process in an amount sufficient to obtain the desired moisture content in the granular material in the duct 50 and the pellets in the hopper 84.

Figure 2:
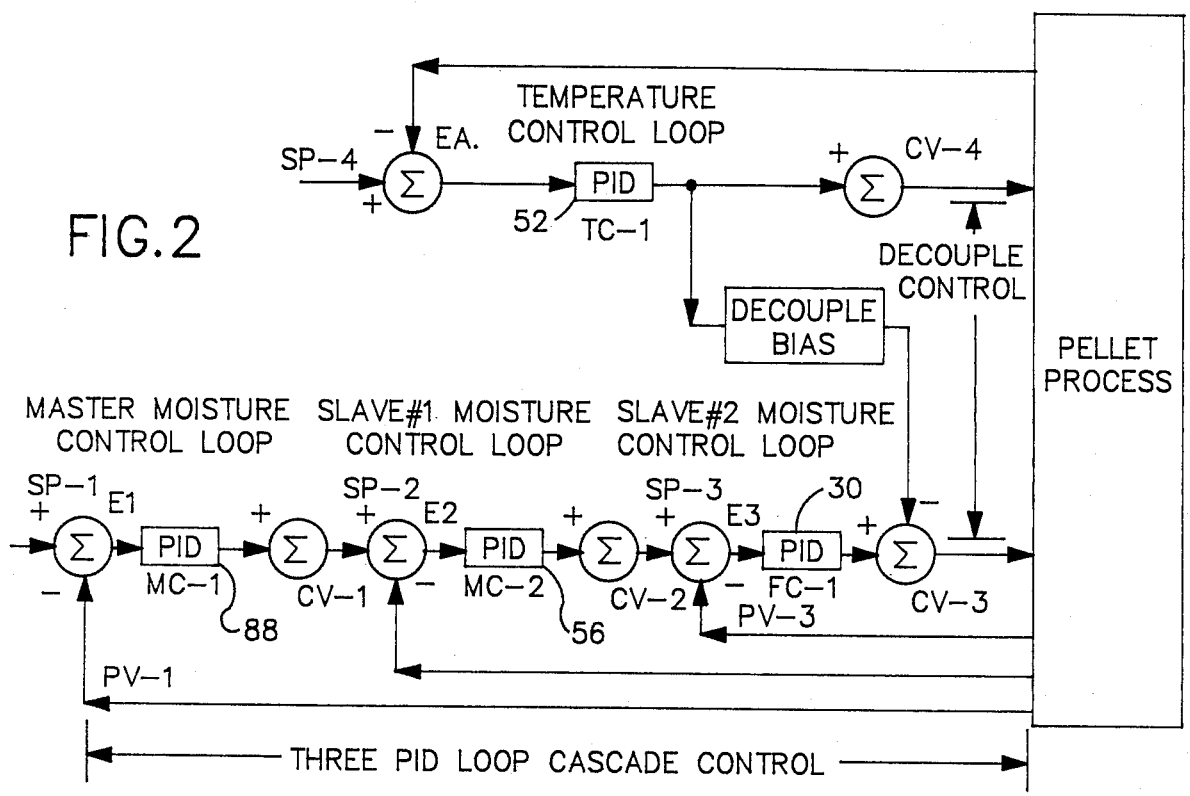
FIG. 2 is a block diagram illustrating the control characteristics of this invention.

In FIG. 2, there is a block diagram illustrating the control characteristics for the above-described process for a moisture control system with the four major process controls 30, 52, 56 and 88. Cascade control is shown in the lower half of FIG. 2. There are three separated PID loops. The output of moisture (MC-1) is cascaded into the set point of moisture control loop 2 (MC-2) and the output of loop MC-2 is then cascaded into the set point of flow control loop one (FC-1). Moisture control loop one (MC-1) is called the outer loop, master loop or primary loop. Moisture control loop two (MC-2) and flow control loop one (FC-1) are called the inner, slave or secondary loops. The inner loop senses changes and compensates for them before the outer loop is affected. This type of control is used to reduce the response time of the secondary loops when controlling a primary loop with large inertia.

Decoupling control is shown in the upper half of FIG. 2. Decoupling is also known as multi-loop, multi variable control. This type of control is required because of the interaction between moisture control loop 2 (MC-2) and temperature control loop one (FC-1).

A change in the amount of steam injected into the mixer-conditioner directly affects the moisture of the granular product leaving the mixer-conditioner. This loop interaction is compensated by forwarding output data from temperature control loop one (TC-1) into the feed forward input of flow control loop one (FC-1). A change in the output of temperature control loop one (TC-1) adjusts the output of flow control loop one (FC-1) without affecting the flow control loop (FC-1) PID calculation.

Figure 3:
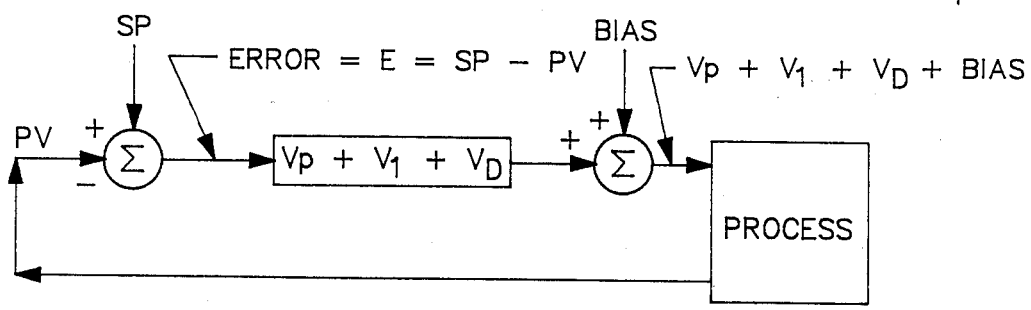
FIG. 3 is a chart of each PID closed loop control.

The PID controller contains features which are user-selected to perform the desired control. FIG. 3 is a simplified diagram of the PID controller features. Basically, the PID module reads the process variable, compares it to the set point and adjusts the analog output to make the process variable equal the set point. The process variable (PV) is the analog input from the process. The set point (SP) is the equilibrium value of the process, and the analog output is the control variable to the process. The difference between the set point and the process variable is the error signal.

The PID controller can perform a combination of proportional, integral and derivative control. The integral control is also known as reset action. Derivative control is also known as rate action.

Figure 4:
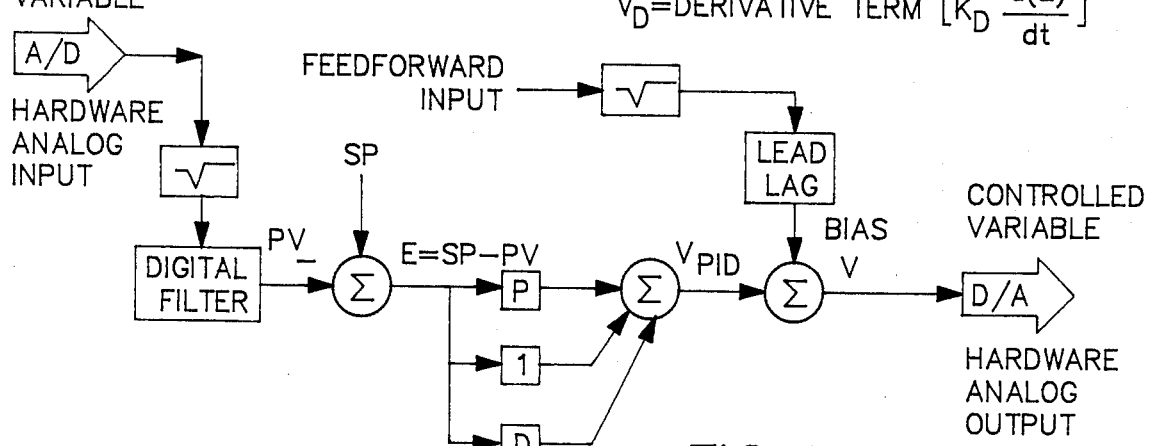
FIG. 4 is a flow chart of the PID algorithm.

The PID controller has many features, only those features that are required for the particular application were selected. Some of the major control functions are shown in FIG. 4. This flow chart shows the relationship of all selectable features.

The PID controller has two analog inputs and one analog output, each with 12 bit binary resolution. Each input and output can be individually selected to either the 4 to 20 ma or +1 to +5 v dc range.

In a preferred embodiment of the invention, the moisture control system is used in a pelletizing process for making cattle feed pellets from by-products of a beer manufacturing process. The dry ingredients comprising spent grain, screenings, sprouts, diatomaceous earth and dust are fed from the bin 2 into the mixer-conditioner at rates of between about 2 and 12 tons per hour. The syrup comprises a sugar-water solution resulting from the manufacturing process and has a solids content of between about 8 and 50% and is fed into the mixer-conditioner at the rate of about 0 to 3 gallons per minute. Steam is supplied in amounts sufficient to maintain the granular material as it is being transferred from the mixer-conditioner to the mill at a temperature between about 70 and 82 degree C. which is generally accomplished by supply (quantity of steam) at 50 psig. The dwell time in the mixer-conditioner is between about 0.95 and 2.225 minutes. The dwell time in the shaker-cooler is about 20 minutes. The pellets are removed from the hopper at the rates of between about 2 and 12 tons per hour. The moisture control system is programmed to maintain the moisture content of the pellets in the hopper at ±0.5% of the desired moisture content which normally is between about 2 to 12% by weight.

Figure 6:
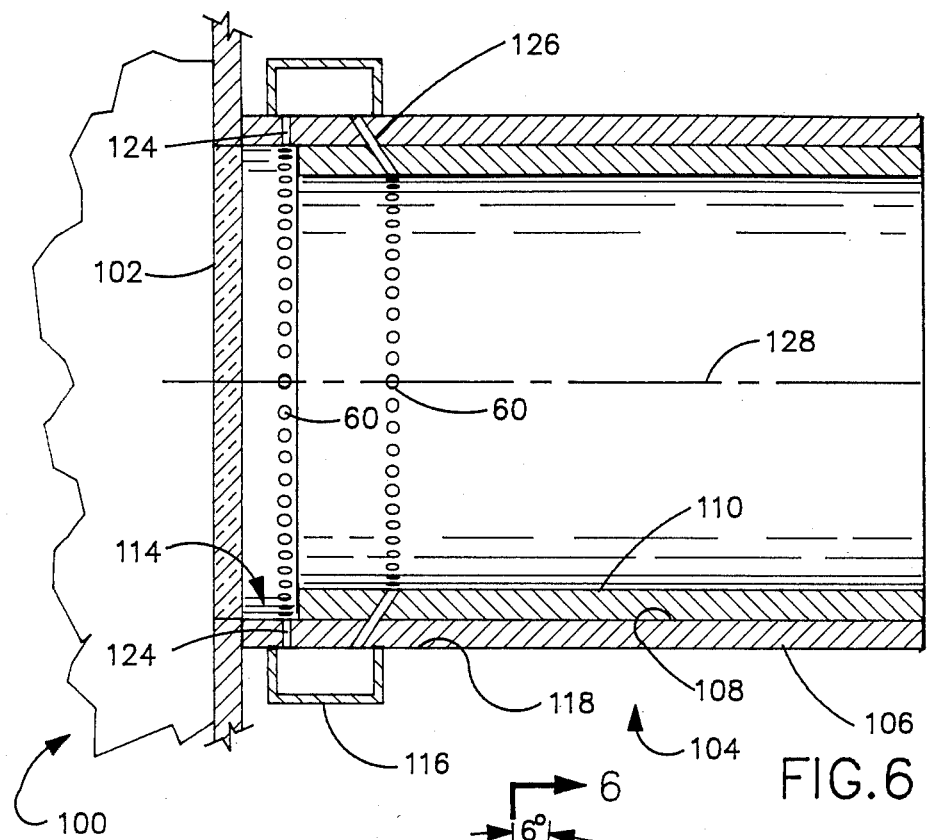
FIG. 6 is a cross-section taken along line 6—6 of FIG. 5.
Figure 5:
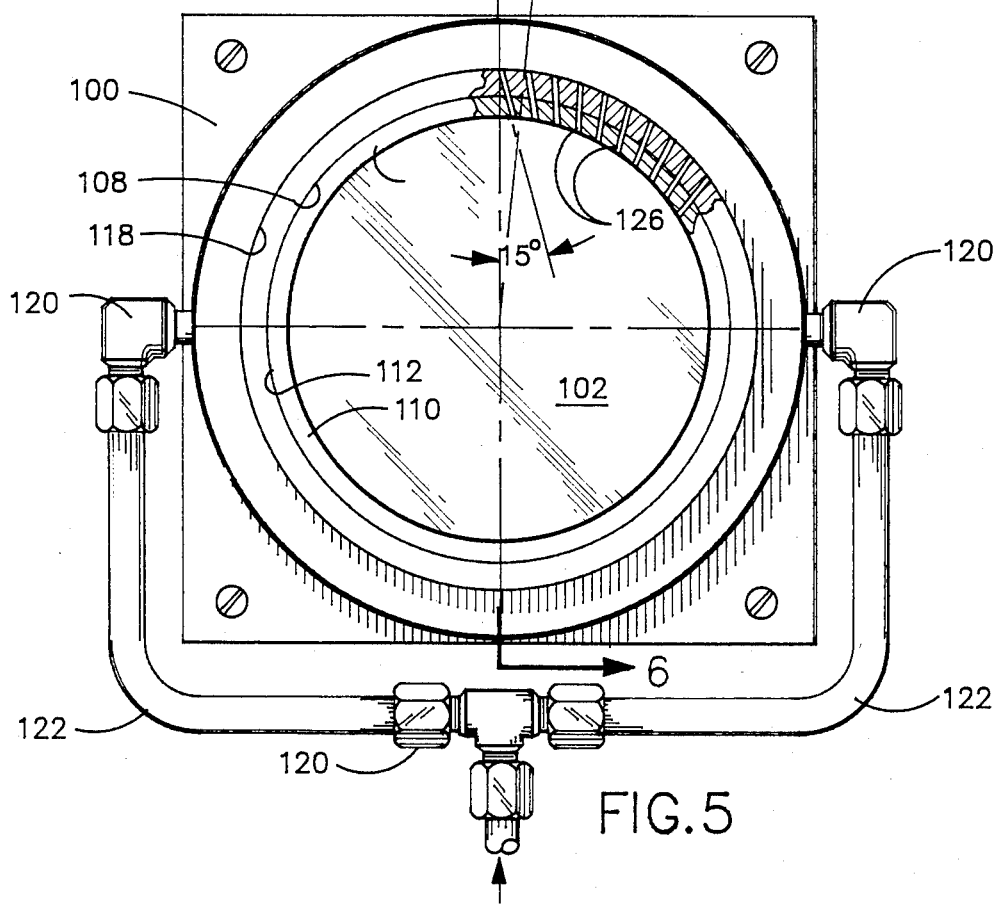
FIG. 5 is a front elevational view of an infrared analyzer with protective means in accordance with this invention.

An infrared analyzer for use in this invention is illustrated in FIGS. 5 and 6 and comprises a housing 100 having conventional means therein to function in a conventional way to make infrared measurements through the circular analyzer window 102. Protective means 104 are provided for the protection of the analyzer window from contamination by deleterious elements in the surrounding in which the infrared analyzer 100 is being used. Such protective means comprises a first sleeve 106 having a cylindrical inner surface 108 having a diameter slightly greater than the diameter of the analyzer window 102 and projecting outwardly therefrom for a substantial distance. A second sleeve 110 having a cylindrical outer surface 112 having an outer diameter equal to or slightly less than the diameter of the inner surface 108 is positioned within and in contact with the first sleeve 106. The second sleeve 110 is formed from an infrared non-reflecting medium, such as bronze. The second sleeve 110 has a length slightly less than the length of the first sleeve 106 so as to form an annular cavity 114 adjacent to the analyzer window 102.

An annular air manifold 116 is secured to a portion of the outer surface 118 of the first sleeve 106 at a location adjacent to the analyzer window 102. The air manifold 116 is connected by fittings 120 and pipes 122 to a source of instrument air at a pressure of 60 psi and flowing at a rate of 6.0 scfm. The first sleeve 106 is provided with a plurality of orifices 124 extending through the first sleeve in a radial direction and opening into the annular cavity 114. The orifices 124 are spaced from each other about every 6 degree around the periphery of the first sleeve 106. A second plurality of orifices 126 extend in a linear direction through both the first sleeve 106 and second sleeve 110. Each orifice 126 extends at an angle to the longitudinal axis 128 of the first sleeve 106 and second sleeve 110 of between about 25 degree and 35 degree and preferably of about 30 degree and also extend at an angle to the radius of the first sleeve 106 and second sleeve 110 of between about 10 degree and 20 degree and preferably of about 15 degree. The orifices 126 are spaced from each other at about 6 degree around the peripheries of the first sleeve 106 and second sleeve 110.

In operation, the air issuing from the orifices 124 into the annular cavity 114 functions to form a curtain of air over the analyzer window 102. The air issuing from the nozzles 126 functions to flow in a vortex pattern in a direction away from the analyzer window 102 so as to remove any contaminants in the sleeve 110 and to impede entry of any contaminants into the sleeve 110.

The diameter and length of the sleeves 106 and 110 will depend on the size of the window to be protected. In one embodiment of the invention, the sleeve 106 has an inner diameter of about 3.375 inches, a length of about 4.75 inches, a wall thickness of about 0.1875 inch and is formed from mild steel. The sleeve 112 has an inner diameter of about 3.00 inches, a length of about 4.25 inches, a wall thickness of about 0.1875 inch and, as stated above, is formed from bronze. Also, the diameter of the orifices 124 and 126 will depend on the size of the window to be protected. In the above-described embodiment of the invention, the orifices 124 and 126 have a diameter of about 0.094 inch.

It is contemplated that the inventive concepts herein described may be variously otherwise embodied and it is intended that the appended claims be construed to include alternative embodiments of the invention except insofar as limited by the prior art.

What is claimed is:

1. A moisture control system for use in a pelletizing process comprising:
holding means for holding a continuous supply of dry ingredients;
means for transferring at variable rates portions of said dry ingredients to a mixer-conditioner;
means for supplying a fluid at variable rates to said mixer-conditioner;
means for supplying steam at variable rates to said mixer-conditioner;
means in said mixer-conditioner for mixing said dry ingredients, said fluid and said steam to form a granular material;
means for feeding said granular material to a mill;
means for measuring the moisture content of said granular material as it passes from said mixer conditioner to said means for feeding said granular material to said mill;
means for generating a signal representative of said moisture content of said granular material;
means for transmitting said signal of said moisture content of said granular material to a granular moisture controller;

means in said granular moisture controller for comparing said signal of said moisture content of said granular material to a set point indicating a desired moisture content for said granular material and for performing a calculation thereon to produce a calculated set point signal;

means for transmitting said calculated set point signal to a fluid flow controller;

means in said fluid flow controller responsive to said calculated set point signal from said granular moisture controller to vary the rate of supply of said fluid so as to vary the amount of said fluid being supplied to said mixer-conditioner;

means for sensing the temperature of said granular material as it passes from said mixer-conditioner to said means for feeding said granular material to said mill;

means for generating a signal reresentative of said temperature;

means for transmitting said signal to a temperature controller;

means in said temperature controller for comparing said signal to a set point indicating a desired temperature for said granular material and for performing a calculation thereon to produce a control variable signal; and means in said temperature controller responsive to said control variable signal to vary the rate at which said steam is being supplied so as to vary the amount of said steam being supplied to said mixer-conditioner.

2. A moisture control system for use in a pelletizing process comprising:

holding means for holding a continuous supply of dry ingredients;

means for transferring at variable rates portions of said dry ingredients to a mixer-conditioner;

means for supplying a fluid at variable rates to said mixer-conditioner;

means for supplying steam at variable rates to said mixer-conditioner;

means in said mixer-conditioner for mixing said dry ingredients, said fluid and said steam to form a granular material;

means for feeding said granular material to a mill;

means for measuring the moisture content of said granular material as it passes from said mixer conditioner to said means for feeding said granular material to said mill;

means for generating a signal representative of said moisture content of said granular material;

means for transmitting said signal of said moisture content of said granular material to a granular moisture controller;

means in sid granular moisture controller for comparing said signal of said moisture content of said granular material to a set point indicating a desired mositure content for said granular material and for performing a calculation thereon to produce a calculated set point signal;

means for transmitting said calculated set point signal to a fluid flow controller;

means in said fluid flow controller responsive to said calculated set point signal from said granular moisture controller to vary the rate of supply of said fluid so as to vary the amount of said fluid being supplied to said mixer-conditioner;

means in said mill for forming said granular material into pellets;

means for feeding said pellets into a shaker-cooler;

a hopper in said shaker-cooler through which said pellets pass to a discharge conveyor;

means for measuring the moisture content of said pellets in said hopper;

means for generating a signal representative of said moisture content of said pellets in said hopper;

means for transmitting said signal representative of said moisture content of said pellets in said hopper to a pellet moisture controller;

means in said pellet moisture conroller for comparing said signal representative of said moisture content of said pellets in said hopper with a set point indicating a desired moisture content for said pellets in said hopper and for performing a calculation thereon to produce a calculated set point signal;

means for transmitting said calculated set point signal from said pellet moisture controller to said granular moisture controller;

means in said granular moisture controller responsive to said calculated set point signal from said pellet moisture controller to change said set point of said desired moisture content for said granular material to a new set point.

3. A system as in claim 2 and further comprising:

means for sensing the temperature of said granular material as it passes from said mixer-conditioner to said means for feeding said granular material to said mill;

means for generating a signal representative of said temperature;

means for transmitting said signal to a temperature controller;

means in said temperature controller for comparing said signal to a set point indicating a desired temperature for said granular material and for performing a calculation thereon to produce a control variable signal; and means in said temperature controller responsive to said control variable signal to vary the rate at which said steam is being supplied so as to vary the amount of said steam being supplied to said mixer-conditioner.

4. A system as in claim 3 and further comprising:

means in said temperature controller for performing a calculation on said control variable signal to produce a control signal representative of the amount of steam condensate resulting from said change in the rate at which said steam is being supplied and for transmitting said control signal to said fluid flow controller; and means in said fluid flow controller responsive to said control signal to vary the rate of supply of said fluid so as to vary the amount of said fluid being supplied to said mixer-conditioner.

5. A system as in claim 1 and further comprising:

means in said temperature controller for performing a calculation on said calculated set point signal from said temperature controller to produce a control signal representative of the amount of steam condensate resulting from said change in the rate at which said steam is being supplied and for transmitting said control signal to said fluid flow controller; and means in said fluid controller responsive to said control signal to vary the rate of supply of said fluid so as to vary the amount of said fluid being supplied to said mixer-conditioner.

* * * * *